Patented July 12, 1938

2,123,698

UNITED STATES PATENT OFFICE 2,123,698

CALCIUM SULPHATE-ZINC SULPHIDE PIGMENT

Marion L. Hanahan, Wilmington, Del., and James D. Prince, Linthicum Heights, Md., assignors, by mesne assignments, to E. I. du Pont de Nemours and Company, a corporation of Delaware No Drawing. Application March 30, 1935, Serial No. 13,908

19 Claims. (Cl. 134—78)

The present invention relates to co-precipitated calcium sulphate-zinc sulphide pigments of low zinc oxide and high zinc sulphide content and to the process of making the same, which comprises reacting a solution containing zinc and sulphate ions with a solution containing calcium and sulphide ions under such conditions that at the end of the precipitation the precipitated pigment is suspended in a liquor containing zinc sulphate and a substantial amount of free sulphuric acid and calcining the so precipitated product in such a condition that the product is in acid condition at least at the beginning of the calcination.

A process for making calcium sulphate-zinc sulphide pigments has been shown in an application by J. E. Booge, Ser. No. 589,980 filed Jan. 30, 1932 (Patent No. 2,016,537, dated October 8, 1935). The process of this application is based on the following equations:

$$ZnSO_4 + Ca(SH)_2 \rightarrow ZnS + CaSO_4 + H_2S$$

The equimolecular pigment obtained in this manner contains theoretically 41.7% ZnS.

When pigments of a higher zinc sulphide content are desired the following equation may be followed

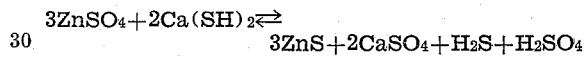
$$3ZnSO_4 + 2Ca(SH)_2 \rightleftarrows 3ZnS + 2CaSO_4 + H_2S + H_2SO_4$$

This equation is, however, partly reversible due to the free acid formed. There is also formed free hydrogen sulphide which is strongly absorbed by the precipitate of zinc sulphide and calcium sulphate in amounts up to 10% of the free hydrogen sulphide, which cannot be removed by known mechanical means. This is of the greatest importance because if the co-precipitate is calcined in the presence of the absorbed hydrogen sulphide the resultant pigment does not have the pure white color which is necessary to render it salable as a white pigment.

These difficulties have been elegantly overcome in the above cited application by J. E. Booge, the process consisting in adjusting the end point of the precipitation, or strike, to a slight alkalinity (after eventual elimination of other soluble compounds or acid by decantation and/or washing), by the addition of small amounts of an alkaline compound, such as caustic soda, calcium hydroxide, zinc oxide, ammonia, etc. and eliminating the soluble sulphide formed or transforming it into additional amounts of zinc sulphide.

On calcination there is then produced a very valuable, white pigment with a zinc oxide content of above 0.1%.

This zinc oxide content is an inherent result of the alkaline endpoint and all efforts to produce a pigment of a lower zinc oxide content in following the process disclosed by Booge in the above identified application have either failed or resulted in products which were entirely unsatisfactory as to whiteness and other pigmenting properties.

This zinc oxide content has a decided importance in the commercial application of pigments.

One disadvantage of pigments comprising zinc sulphide co-precipitated with an alkaline earth metal sulphate is their tendency to react sensitive paint vehicles, such as a reaction resulting in an undue thickening of the paint which in time may set up to a solid mass, or "liver". In calcium sulphate—zinc sulphide pigments we ascribe this tendency toward reactivity to the presence of relatively large amounts, such as more than 0.1% of reactive zinc oxide probably present on the surface of the particles in very reactive form.

The effect of zinc oxide in the calcined pigment in causing thickening, or livering, of sensitive paint vehicles is probably due to neutralization of essential acids in the paint vehicle by reaction with the zinc oxide. It is known that many paint vehicles contain colloidal material which is maintained in a dispersed or peptized form by the presence of the organic acids. The removal of these acids, or peptizing agents, e. g. by reaction with the zinc oxide, leads to a coagulation of the colloidal material which causes thickening or jellying of the paint.

The production of novel non-reactive calcium sulphate-zinc sulphide white pigments of a zinc oxide content below 0.1% and satisfactory strength is the result of our present invention. Our novel pigments show a very much reduced tendency to liver and have all the necessary characteristics of whiteness, strength, etc. desired for their commercial use in paints, or other coating and plastic compositions.

Our novel process can be illustrated by the following formula:

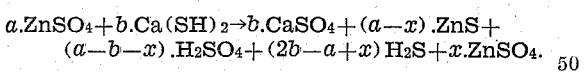
$$a.ZnSO_4 + b.Ca(SH)_2 \rightarrow b.CaSO_4 + (a-x).ZnS + (a-b-x).H_2SO_4 + (2b-a+x)H_2S + x.ZnSO_4.$$

In this formula $a$ must be equal or greater than $b$. If $a$ is greater than $2b$ there will be present an additional excess of $ZnSO_4$ corresponding to $(a-2b)$.

$x$ is a variable which depends upon various factors, namely for instance the concentration of the solutions, their temperature, the value of $(a-b)$, the amount of $H_2S$ permitted to escape the reaction mixture and upon any excess of free sulphuric acid which may have been added separately to the reaction mixture.

It is desired to keep the value of $x$ relatively small, so as to leave not too large an excess zinc sulphate in solution. $x$ should, however, not be negligible as the excess zinc sulphate is an essential element in our invention. This excess zinc sulphate does not represent a loss as it is either recovered from the mother liquors by any known means or, if relatively pure solutions are employed, the mother liquor of the reaction could be re-used in a subsequent operation.

One practical means of maintaining $x$ within operative and yet economical limits is to maintain a substantial concentration of $H_2S$ in the reaction medium. This can be achieved singly or jointly by effecting the precipitation (commonly called "strike") at relatively low temperature, for instance between 0° to about 30° C. and by operating in an atmosphere having a high pressure of $H_2S$ where the liquid is saturated with $H_2S$. A partial $H_2S$ pressure of at least 700 m. m. mercury above the reaction liquid is, for instance, very convenient. It is also contemplated to operate the strike under an atmosphere of an $H_2S$ pressure greater than atmospheric.

Another means of obtaining a low figure for $x$ is to use very dilute solutions. This, however, is not economical and we prefer in general to control the value of $x$ by controlling temperature, excess zinc sulphate, hydrogen sulphide concentration, etc.

Very practical operating conditions are obtained when the mother liquor of the precipitated pigment has a $ZnSO_4$ concentration at room temperature of between 1 and 20 grams per liter and the concentration of free sulphuric acid is between 1 and 50 grams per liter.

These are, however, not absolute limits within which we can operate our process and concentrations, below or above those specified can be used, though the best results have been obtained with the above concentrations of zinc sulphate and free sulphuric acid in the strike liquor.

It was found that part of the excess zinc sulphate and free acid remains absorbed or otherwise held firmly on the precipitated particles of zinc sulphide and calcium sulphate so that they cannot readily be removed by washing, and they produce a specific beneficial action during calcination of the pigment.

It is our theory that this absorbed, or adsorbed, zinc sulphate reacts with the adsorbed $H_2S$ at some later stage in the process, probably during calcination and prevents the $H_2S$ from exercising its deleterious effect upon color and other properties of the pigment. The adsorbed free sulphuric acid prevents decomposition of the zinc sulphate into zinc oxide and thereby contributes in preventing the formation of zinc oxide.

There should therefor be a certain relationship between the excess reagents present in the raw pigment before calcination.

Zinc sulphate in excess over that corresponding to the $H_2S$ and sulphuric acid present tends to be converted during calcination to zinc oxide and $SO_3$ or $SO_2$ + oxygen. Actually there should be present enough zinc sulphate in the raw pigment to react with the $H_2S$ and render it harmless but no substantial excess over this amount.

Practically the limit of zinc sulphate in the dry raw pigment prior to calcination should not exceed 1.5% and can be as low as, for instance, 0.05%, at which the beneficial effect will still be noticeable.

A content of 1.5% zinc sulphate or less can be obtained by the choice of a low concentration of zinc sulphate in the mother liquor of the strike, or by washing the raw, uncalcined pigment, while maintaining an acid reaction in the wash liquors.

The effect of zinc sulphate present in the raw pigment on calcination upon the zinc oxide content of the calcined pigment is illustrated in the following table:

| No. | Mother liquor of pigment contained grams per liter | | Treatment of pigment | Dry raw pigment contained percent $ZnSO_4$ | Calcined pigment contained | |
|---|---|---|---|---|---|---|
| | $ZnSO_4$ | $H_2SO_4$ | | | Percent ZnS | Percent ZnO |
| 1 | 16.7 | 20.4 | Unwashed | 1.93 | 45.29 | 0.35 |
| 2 | 10.4 | 17.4 | Unwashed | 1.75 | 45.00 | 0.35 |
| 2a | 2.9 | 4.0 | Washed | 1.11 | 45.40 | 0.07 |
| 3 | 5.8 | 12.1 | Unwashed | 1.25 | 45.40 | 0.09 |
| 3a | 1.0 | 2.2 | Washed | 0.44 | 46.24 | 0.06 |
| 4 | 1.4 | 10.1 | Unwashed | 0.60 | 45.31 | 0.09 |
| 4a | 0.4 | 1.8 | Washed once | 0.29 | 44.39 | 0.05 |
| 5 | 20.4 | 12.2 | Unwashed | 2.27 | 45.89 | 0.63 |
| 5a | 11.8 | 4.8 | Washed | 1.22 | 46.24 | 0.06 |
| 5b | 7.3 | 3.2 | Washed | 0.92 | 46.09 | 0.08 |
| 5c | 4.3 | 1.8 | Washed | 0.78 | 46.67 | 0.07 |

The results listed show clearly the influence of the amount of zinc sulphate contained in the dry raw pigment upon the zinc oxide content of the calcined product.

Operations 1, 2, 3, 4 and 5 show how the excess zinc sulphate content in the strike affects the zinc sulphate content of the raw pigment.

3 corresponds exactly to Example 1 to be found below in which 2,600 parts by volume of calcium hydrosulphide liquor are combined with 3,160 parts by volume of a zinc sulphate solution. In #1, 3,360 parts of the zinc sulphate solution were used, in #2, 3,260 parts, in #4, 3,000 parts and in #5, 3,400 parts.

The table shows further how the zinc sulphate content of the raw pigment can be decreased by washing the raw pigment. In operations 2a, 3a and 4a the raw pigment of 2, 3 and 4 respectively, were repulped with 2,700 parts of water at room temperature and filtered; the figures in the second and third columns of the table give the zinc sulphate content of the filtrate from the repulping step. Operations 5a, b and c refer to the same strike as 5 except that the pigment was repulped in water and filtered before calcination and in 5a, 700 parts of water, in 5b, 1,500 parts and in 5c, 3,000 parts of water were used in the repulping step.

When it is desired to decrease the zinc sulphate content of the raw pigment to a point below 1.5% we wash the pigment but as an acid reaction of the pigment is essential we are careful not to eliminate all the acid when removing part of the zinc sulphate.

This washing may be accomplished by any of the well known methods. It may be washed directly on the filter or the cake may be repulped and refiltered.

Care must be taken to maintain the wash waters at all times at a pH of not greater than 2. While this can be done by using water as the washing fluid we can also use a dilute solution of sodium, ammonium, or potassium hydroxide, etc., but among the various methods tried we prefer washing on the filter with water followed by a short washing with a dilute calcium hydroxide solution to a pH of not greater than 2.0

It is further preferred to use in the precipitation calcium hydrosulphide solutions which are free from elemental sulphur and complex sulphides which would lead to the precipitation of colloidal free sulphur which would greatly interfere with the filtration and washing of the raw pigment.

It is not advisable to leave too great an excess of hydrogen sulphide dissolved in the raw pigment slurry after the precipitation is completed. Whether the strike has been made under superatmospheric or atmospheric pressure it is preferable to put the strike under a vacuum, without temperature increase and thereby remove the major part of the dissolved hydrogen sulphide.

The raw pigment is then calcined in a manner similar to the calcination of lithopones. While the calcination conditions are not particularly critical we prefer to calcine between 600 and 900° C. and in a non-oxidizing atmosphere. In general, higher zinc sulphide pigments require the higher temperatures in order to develop maximum strength.

In the following we shall further illustrate our invention by specific examples of how we prepared our novel, white zinc sulphide-calcium sulphate pigments of low zinc oxide content.

It will be understood that our invention is not limited to the specific conditions and proportions given therein:

Example 1

2,600 parts by volume of a calcium hydrosulphide liquor containing 239 grams per liter $Ca(SH)_2$ was placed in an acid and alkali resisting vat of a capacity of 8,000 volume units equipped with an efficient stirrer and a close fitting cover provided with an exhaust pipe which could be connected with a vacuum pump.

To this solution was added over a period of 23 minutes 3,160 parts by volume of a zinc sulphate solution containing 349 gr./l. of $ZnSO_4$. The hydrogen sulphide formed was allowed to escape and at the conclusion of the strike the slurry was submitted to a vacuum of 10 inches of mercury for 5 minutes, while stirring of the solution was continued.

The whole strike was effected at a temperature of about 20 to 25° C.

The molecular ratio of $Ca(SH)_2:ZnSO_4$ in this strike was 1:1.17.

The pigment slurry was filtered and the filtrate found to contain 5.78 gr./l. of $ZnSO_4$ and 12.1 gr./l. of $H_2SO_4$. The raw pigment was dried at about 110° C. for about 1 hour. It contained after drying 1.25% $ZnSO_4$ and about 9% moisture, it had a strong acid reaction.

This dried raw pigment was then calcined in an externally heated furnace at a temperature of 650° C. in a non-oxidizing atmosphere.

The calcined pigment was quenched in water and wet ground in a ball mill. The finished pigment contained 45.40% ZnS and 0.09% ZnO, i. e. a ratio of 1 $CaSO_4$: 1.15 ZnS. It had a tinting strength of 182 and a color of 10.

Example 2

The strike was effected as in Example 1, except that 3,000 parts by volume of the same zinc sulphate solution was used for 2,600 parts of the calcium hydrosulphide solution.

The pigment slurry was filtered and the filtrate contained 1.36 g./l. of $ZnSO_4$ and 10.1 g./l. of $H_2SO_4$. The filtrate was sucked substantially dry and repulped with 5,400 parts of water at room temperature. The filtrate from the repulp step contained 0.4 g./l. of $ZnSO_4$ and 1.76 g./l. of $H_2SO_4$. The washed precipitate was dried for about one hour at 110° C. After drying the raw pigment contained 0.29% $ZnSO_4$ and about 13% moisture and was decidedly acid.

The raw pigment was then calcined and ground as in Example 1. The finished pigment contained 44.39% ZnS and 0.05 ZnO, or a ratio of 1 $CaSO_4$:1.1 ZnS. It had a tinting strength of 168 and a color of 10.

Example 3

The strike was effected as in Examples 1 and 2 except that 3,400 parts of the same zinc sulphate solution was combined with the 2,600 parts calcium hydrosulphide (1 $Ca(SH)_2$:1.25 $ZnSO_4$).

The raw pigment slurry was filtered and found to contain 20.4 g./l. of $ZnSO_4$ and 12.2 g./l. of $H_2SO_4$. The filter cake was sucked dry and repulped in 300 parts of water at room temperature. The filtrate from the repulp step contained 7.3 g./l. of $ZnSO_4$ and 3.18 g./l. of $H_2SO_4$. The washed precipitate was dried for about one hour at about 110° C. after which it contained 0.92% $ZnSO_4$ and about 8% moisture. This raw pigment was decidedly acid.

The dried raw pigment was calcined and ground as in Example 1. The finished pigment contained 46.09% ZnS and 0.08% ZnO, a ratio of 1 $CaSO_4$:1.19 ZnS.

The pigment had a tinting strength of 182 and a color of 12.

It will be seen that the pigments produced according to these examples contained less than 0.1% ZnO and when incorporated into reactive paint compositions the resulting paints were substantially free from livering.

In strength, light fastness and color our pigments are entirely outstanding.

The strength we attribute to the method of precipitating at low temperature and to acid conditions during the strike and further handling. A tinting strength of 150 is so far as we are aware the highest figure obtainable by other processes producing pigments of low zinc oxide content.

In color and whiteness as well as tinting strength our novel pigments are comparable with the best barium lithopones of corresponding composition on the market. Colors of a gradation substantially below 10 are entirely unsuited for commercial applications as they produce yellowish paints.

The color and tinting strength determinations referred to herein are based upon standard procedure and practice in accordance with the testing methods set forth and described by J. E. Booge and H. E. Eastlack in the April 16, 1924 issue of the "Paint, Oil and Chemical Review", pages 11—12.

The combination of low zinc oxide content (in other words non-livering properties) and whiteness is entirely novel in our zinc sulphide-calcium sulphate pigments. Pigments of this type as available heretofor were either of a yellowish cast when of non-livering properties, or if satisfactory in whiteness were livering or had both defects.

We claim:

1. In a process of making a calcium sulphate-zinc sulphide pigment, the steps of reacting zinc sulphate with an aqueous solution of calcium hydrosulphide, maintaining in the reaction mixture at the end of precipitation a substantial excess of, but not to exceed more than about 20 grams of zinc sulphate per liter, and from 1 to 50 grams of sulphuric acid per liter, and subjecting the resultant precipitate to calcination in a non-oxidizing atmosphere to develop its pigment properties.

2. In a process of making a calcium sulphate-zinc sulphide pigment, the steps of reacting zinc sulphate with an aqueous solution of calcium hydrosulphide and establishing in the reaction liquor in contact with the pigment at the end of the precipitation a concentration of from 1 to 20 grams of zinc sulphate per liter and a concentration of from 1 to 50 grams of sulphuric acid per liter, and calcining in a non-oxidizing atmosphere the resultant precipitate containing zinc sulphate and sulphuric acid to develop its pigment properties.

3. In a process of making a calcium sulphate-zinc sulphide pigment, the steps of reacting zinc sulphate with an aqueous solution of calcium hydrosulphide while maintaining in the reaction mixture at the end of precipitation an excess of zinc sulphate ranging from .4 to 20 grams per liter and from 1 to 50 grams of sulphuric acid per liter, washing the resultant precipitate and calcining said precipitate in a non-oxidizing atmosphere and under conditions where the precipitate contains free acid and zinc sulphate at the start of the calcination.

4. In a process of making a calcium sulphate-zinc sulphide pigments, the steps of reacting zinc sulphate with an aqueous solution of calcium hydrosulphide while establishing in the reaction liquor in contact with the pigment at the end of the precipitation a concentration of from 1 to 20 grams of zinc sulphate per liter and a concentration of from 1 to 50 grams of sulphuric acid per liter, and calcining said precipitate in a non-oxidizing atmosphere and under conditions where the precipitate contains free acid and zinc sulphate at the start of the calcination.

5. In a process of making a calcium sulphate-zinc sulphide pigment the steps of reacting zinc sulphate with an aqueous solution of calcium hydrosulphide while maintaining a concentration in the reaction mixture at the end of the precipitation of an excess of zinc sulphate ranging from .4 to 20 grams per liter and from 1 to 50 grams of sulphuric acid per liter, washing said precipitate to a point where it has an acidity corresponding to a pH of between 1 and about 6 and calcining said washed pigment in a non-oxidizing atmosphere to develop its pigment properties.

6. In a process of making a calcium sulphate-zinc sulphide pigment the steps of reacting zinc sulphate with an aqueous solution of calcium hydrosulphide while maintaining in the reaction mixture at the end of the precipitation from substantially 1 to 20 grams of zinc sulphate and substantially 1 to 50 grams of free sulphuric acid, washing said precipitate to a point where it has an acidity corresponding to a pH of between 1 and about 6 and contains a substantial amount of zinc sulphate, and calcining said washed pigment in a non-oxidizing atmosphere.

7. In a process of making a calcium sulphate-zinc sulphide pigment the steps of reacting zinc sulphate with an aqueous solution of calcium hydrosulphide while maintaining a concentration in the reaction mixture at the end of precipitation of an excess of zinc sulphate ranging from .4 to 20 grams per liter and from 1 to 50 grams of free sulphuric acid per liter, washing the precipitate to the point where it has an acid reaction and contains not more than 1.5% zinc sulphate and calcining said washed precipitate in a non-oxidizing atmosphere to develop its pigment properties.

8. In a process of making a calcium sulphate-zinc sulphide pigment, the step of calcining under non-oxidizing conditions a raw pigment comprising zinc sulphide and calcium sulphate, the former being present in more than equimolecular proportion than the latter, said pigment having a sulphuric acid reaction and containing a substantial excess of but not to exceed more than about 1.5% zinc sulphate.

9. The process of claim 8 in which calcination is effected at between 600 and 900° C.

10. The process of claim 8 in which calcination is effected at between 600 and 900° C. and in a non-oxidizing atmosphere.

11. In a process of making a calcium sulphate-zinc sulphide pigment the step of calcining in a non-oxidizing atmosphere a raw pigment comprising zinc sulphide and calcium sulphate which has a sulphuric acid reaction and which contains a substantial amount of zinc sulphate which amount is insufficient to yield as much as 0.1% zinc oxide on calcination at 600 to 700° C. in a non-oxidizing atmosphere.

12. The process of claim 1 in which the precipitation is effected at a temperature of from 0 to 30° C.

13. The process of claim 1 in which the reaction liquid is saturated with $H_2S$ under a pressure of $H_2S$ equal to at least 700 millimeters of mercury.

14. The process of claim 1 in which the precipitation is effected under a pressure of $H_2S$ greater than atmospheric.

15. A pigment comprising co-precipitated calcium sulphate and zinc sulphide and not more than 0.1% zinc oxide after heat treatment to develop its pigment properties, said pigment, prior to calcination containing from about .05% to 1.5% of zinc sulphate and a sufficient amount of sulphuric acid to prevent decomposition of said zinc sulphate into zinc oxide during calcination, and after calcination being non-reactive and anti-livering in character and having a whiteness at least equal to that of commercial barium lithopone of corresponding composition.

16. A white pigment comprising co-precipitated calcium sulphate and zinc sulphide and not more than 0.1% zinc oxide after calcination to develop its pigment properties, said pigment, prior to calcination containing from about .05% to 1.5% of zinc sulphate and a sufficient amount of sulphuric acid to prevent decomposition of said zinc sulphate into zinc oxide during calcination, and after calcination being non-reactive and anti-livering in character and having a tinting strength at least equal to that of commercial barium lithopone of corresponding composition.

17. A pigment comprising co-precipitated calcium sulphate and zinc sulphide and not more than 0.1% zinc oxide after calcination to develop its pigment properties, said pigment, prior to calcination containing from about .05% to 1.5% of zinc sulphate and a sufficient amount of sulphuric acid to prevent decomposition of said zinc sulphate into zinc oxide during calcination, and after calcination being characterized by producing substantially non-livering paints with a reactive oil paint vehicle and being of a whiteness and tinting strength at least equal to those of a commercial barium lithopone of corresponding composition.

18. A pigment comprising co-precipitated calcium sulphate and zinc sulphide, said pigment, prior to calcination containing from about .05% to 1.5% of zinc sulphate and a sufficient amount of sulphuric acid to prevent decomposition of said zinc sulphate into zinc oxide during calcination, and after calcination to develop its pigment properties being non-reactive and anti-livering in character and containing not more than 0.1% of zinc oxide after calcination to develop its pigment properties, said pigment having a tinting strength and whiteness at least equal to those of a commercial barium lithopone of corresponding composition.

19. The product of claim 17 when it contains more zinc sulphid than corresponds to the molecular ratio of 1 ZnS to 1 CaSO$_4$.

MARION L. HANAHAN.
JAMES D. PRINCE.